United States Patent [19]

LaBudde

[11] Patent Number: 4,829,305

[45] Date of Patent: May 9, 1989

[54] MEDIUM DISTANCE MEASUREMENT SYSTEM AND METHOD

[75] Inventor: Edward B. LaBudde, Westlake Village, Calif.

[73] Assignee: LuBudde Engineering Corporation, Westlake Village, Calif.

[21] Appl. No.: 717,524

[22] Filed: Mar. 29, 1985

[51] Int. Cl.[4] ............................................. G01S 13/08
[52] U.S. Cl. ..................................... 342/127; 342/118
[58] Field of Search ................... 343/12 R, 7.5, 12 A; 356/5

[56] References Cited

U.S. PATENT DOCUMENTS

| | | | |
|---|---|---|---|
| 3,778,160 | 12/1973 | Wolcott | 356/5 |
| 4,238,795 | 12/1980 | Schiek et al. | 342/127 |
| 4,403,857 | 9/1983 | Hölscher | 342/127 |
| 4,537,502 | 8/1985 | Miller et al. | 342/127 |
| 4,646,092 | 2/1987 | Schreuder | 342/127 |

OTHER PUBLICATIONS

R. E. Sampson et al., "Real Time 3 Dimensional Image Processing for Robot Applications", Infrared and Optics Division, Environmental Research Institute of Michigan.

Primary Examiner—Thomas H. Tarcza
Assistant Examiner—Donald Hayes, Jr.
Attorney, Agent, or Firm—Koppel & Harris

[57] ABSTRACT

A system and method are disclosed for measuring medium range distances, of about 1-10 meters, to a target. A transmission signal is reflected off the target, with the phase difference between the transmitted and received signals taken as an indication of the target distance. The transmitter and receiver are part of a phase-locked loop, with a VCO adjusting the transmission frequency until a predetermined transmission-reception phase difference is reached. A coarse distance measurement is first obtained by comparing the transmitted signal with the received signal, followed by a fine distance measurement in which a multiple of the transmission signal frequency is compared with the received signal. The frequency multiplication in the preferred embodiment is obtained by dividing the VCO output frequency to obtain the transmission frequency. The transmission signal is initially set at a low frequency prior to the coarse adjustment to avoid phase ambiguities. Numerous different types of transmission signals can be used, although optical signals are preferred. The invention is particularly adapted for robotics applications.

24 Claims, 2 Drawing Sheets

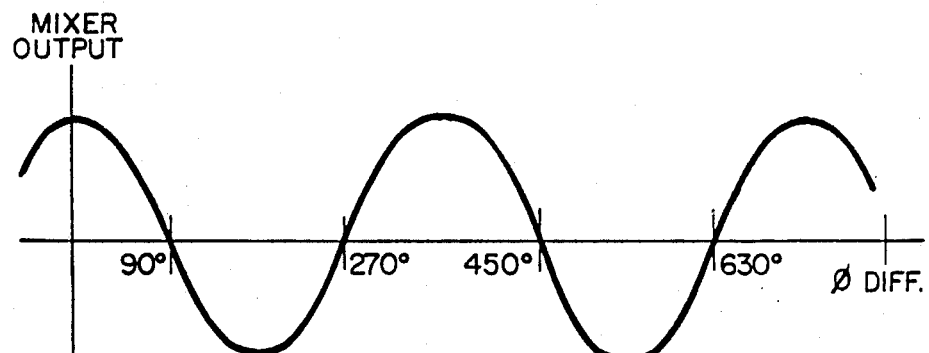
Fig.2.
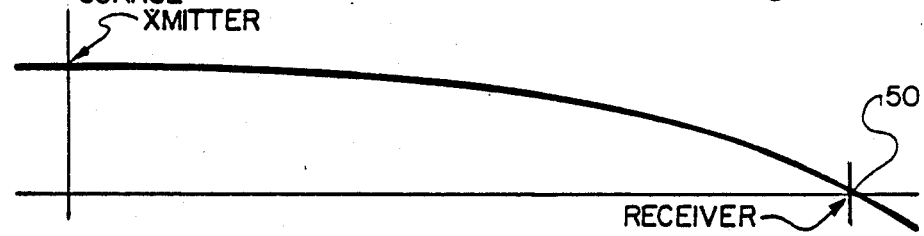
Fig.3.a.
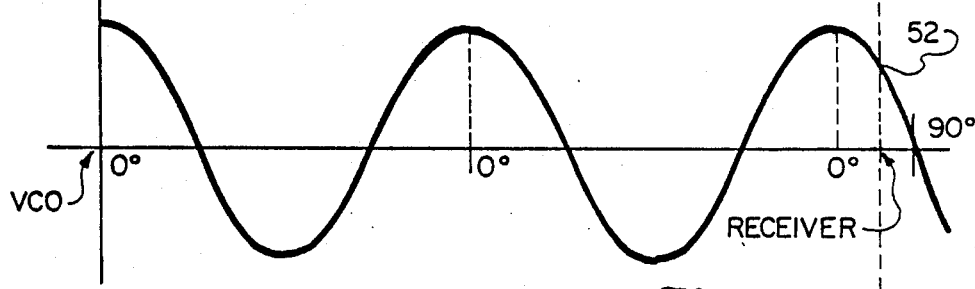
Fig.3.b.
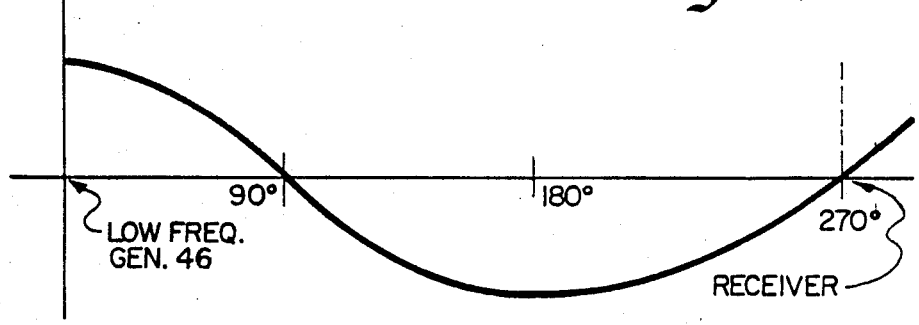
Fig.4.

MEDIUM DISTANCE MEASUREMENT SYSTEM AND METHOD

BACKGROUND OF THE INVENTION

1. Field of the Invention

This invention relates to distance and methods, and more particularly to systems and methods in which a signal transmitted to the target is compared with a signal reflected back from the target to determine the round trip distance, and thereby the distance to the target.

2. Description of the Prior Art

Numerous systems are available for accurately measuring long distances. For example, precise long distance measurements can be obtained by transmitting a radar signal to a target and observing the signal transit time, either one-way or round trip. Similarly, a variety of sensors are available for obtaining accurate measurements of short distances. However, it is difficult to accurately measure medium distances in the range of about 1–10 meters. Fast response, non-contact medium distance measurement systems are desirable for various applications, such as robotics control, manufacturing and testing.

One of the problems with non-contact measurement systems in the medium distance range is that it is difficult to accurately measure the signal transit time from a reference source of electromagnetic radiation to a target. Electromagnetic radiation can normally complete a round trip to a medium distance target within an elapsed time in the nanoseconds regime. It is very difficult to accurately measure such minute time spans.

SUMMARY OF THE INVENTION

In view of the above problems associated with the prior art, it is an object of the present invention to provide a novel and improved system and method for non-contact measurement of medium range distances to a target of about 1–10 meters with a high degree of accuracy and reliability.

Another object is the provision of such a system and method which measures the transit time to a target with approximately picosecond accuracy, but without actually measuring to picoseconds.

An additional object is the provision of such a system and method which is highly responsive to changes in the target distance and yet avoids the use of very high transmitting frequencies, which are difficult to work with.

These and other objects of the invention are achieved in a system which includes means for transmitting a periodic transmission signal toward a target, and means for receiving at least a portion of the signal reflected back from the target. The transmitted and received signals are compared to determine the phase difference therebetween, and by means of a feedback loop causes the frequency of the transmitted signal to be adjusted until a predetermined phase difference between the signals applied to the signal comparing means is reached. This phase difference corresponds to a coarse distance measurement. After the coarse distance measurement has been achieved, a signal having a frequency which is a predetermined multiple greater than the transmission signal frequency is applied to the signal comparison means for comparison with the received signal. This enables a frequency adjustment means in the feedback loop to adjust the frequency of the transmission signal until a predetermined phase difference between the frequency multiplied signal and the received signal, corresponding to a fine distance measurement, is reached. An output means is provided to indicate the target distance corresponding to the adjusted transmission signal frequency. The use of a multiplied frequency yields a more accurate distance measurement than would be attainable with the transmission signal frequency, while limiting the measurement of errors that would normally accompany a higher transmission frequency.

In a preferred embodiment, a low frequency signal is initially applied to the signal comparison means for comparison with the reflected signal before the coarse connection is made. By thus establishing the transmission signal at an initial relatively low frequency, possible ambiguities during coarse measurement as to the transmission signal wavelength, due to the periodic nature of the signal, are avoided. The low frequency signal has a wavelength of at least about 4/3 times the round trip transmission signal distance corresponding to the longest distance to be measured, and is preferably provided by a simple ground connection.

The signal comparison means is preferably a signal mixer which produces a stable null output when the phase difference between its input signals is $(90° + n360°)$, where $n$ is an integer. The feedback loop comprises a phase-locked loop which includes a voltage controlled oscillator (VCO) connected to the output of the mixer through a loop filter, and a frequency divider connected between the output of the VCO and the signal transmitter. The signal applied to the transmitter is compared with the reflected signal for the coarse adjustment, while the signal at the input to the frequency divider is used for the fine measurement. The system achieves a highly accurate distance measurement within the medium distance range, with an error on the order of 0.1%–1%.

These and other features and objects of the invention will be apparent to those skilled in the art from the following detailed description of preferred embodiments, taken together with the accompanying drawings in which:

DESCRIPTION OF THE DRAWINGS

FIG. 2 is a graph showing the transfer characteristic of a signal mixer used in the system;

FIGS. 3A and 3B are graphs illustrating the low and high frequency signals used to obtain coarse and fine distance measurements, respectively; and FIG. 4 is a graph of a signal used to initially set up the system.

DETAILED DESCRIPTION OF PREFERRED EMBODIMENTS

Figure 1:
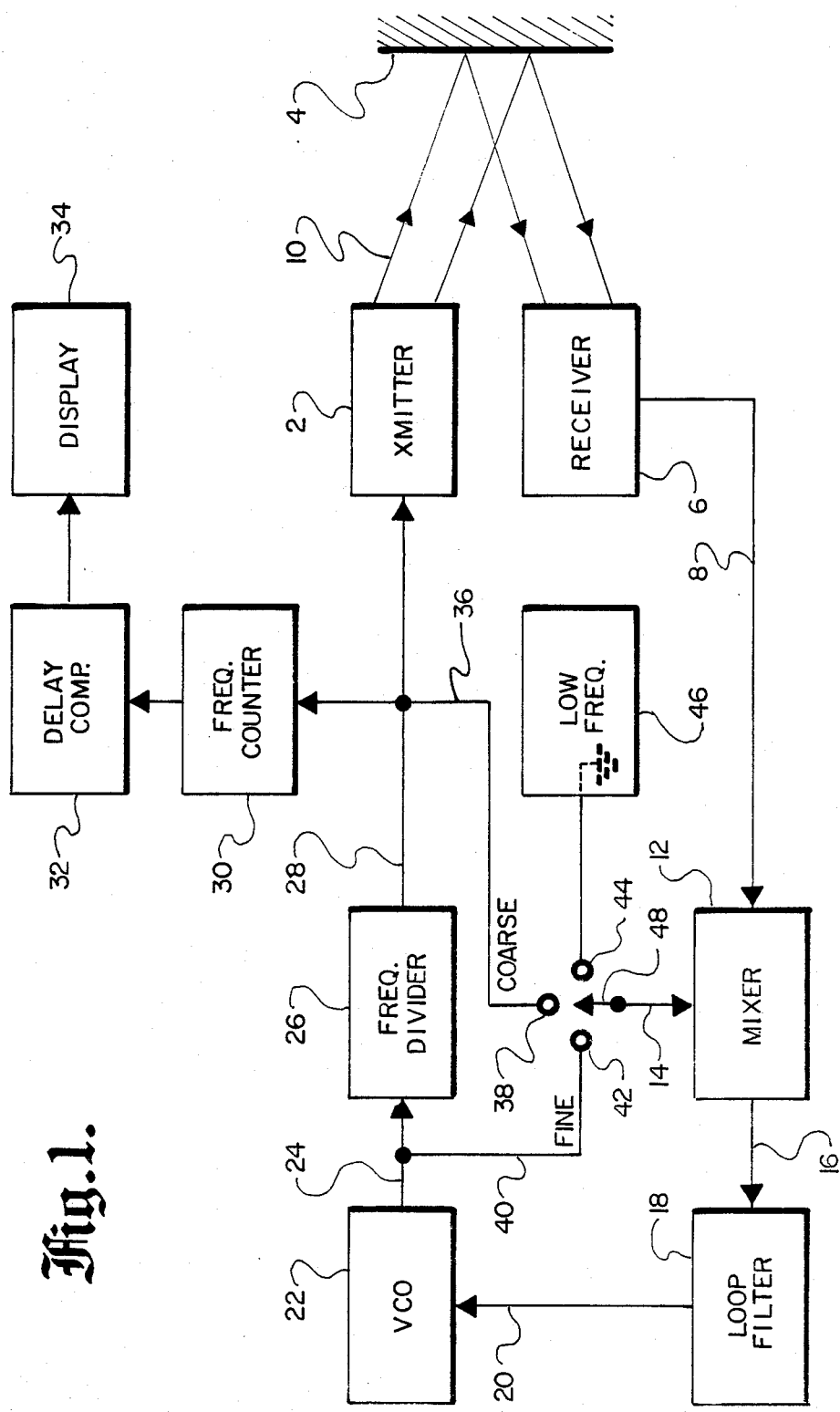
FIG. 1 is a block diagram of a distance measurement system within the scope of the invention.

A block diagram of a system constructed in accordance with the present invention is shown in FIG. 1. A transmitter 2 is used to transmit a signal toward a target 4, the distance to which is to be measured. The transmitted signal is reflected off the target surface and back to a receiver 6, which produces an output signal over line 8 having the same frequency as the received signal.

The positions of transmitter 2 and received 6 are known, and the distance to target 4 is obtained as a function of the round trip signal transit time between the transmitter and receiver by way of the target. A collimated signal path 10, such as would be obtained by the beam that would be produced by a laser transmitter, is shown for purposes of illustration, but the transmission signal could be focused in various ways as desired. Since a substantial portion of the transmitted signal may be lost to the receiver because of signal dispersion and/or the placement of the receiver relative to the target, the receiver should be fairly sensitive and should preferably encompass a fairly wide area. Alternately, a common transmitter/receiver (transceiver) could be used, with the transmission signal reflected back from the target along the same path as its transit to the target.

There is a considerable range of selection for the transmission signal, so long as it is periodic and capable of being transmitted through the ambient medium to the target without substantial dissipation. For example, sonic, ultrasonic or electromagnetic signals such as radio frequency could be used. However, optical signals are preferred because, as utilized in the present invention, they have a frequency which is high enough to produce accurate distance measurements, but low enough to be easily handled. The term "optical" is used herein in the broad sense to include not just the visible portion of the spectrum, but also infrared and ultraviolet.

The output of receiver 6 is transmitted over line 8 to a conventional mixer 12, which compares the received signal with another signal provided to a second mixer input over line 14. This latter input is derived from the transmitted signal, and its comparison with the received signal from line 8 is used to provide an indication of the signal transit time between the transmitter 2 and receiver 6, and thus the distance to a target.

Mixer 12 produces an output over line 16 which is connected by means of a feedback loop back to transmitter 2. The feedback loop causes the transmitted signal frequency to be adjusted until it reaches a predetermined phase difference with respect to the received signal. The transmission signal frequency at which this phase difference is reached is then taken as an indication of the distance to the target.

The response of mixer 12 to its input signals over lines 8 and 14 is illustrated in the graph of FIG. 2. The horizontal axis corresponds to the phase difference between the two input signals, while the vertical axis indicates the magnitude of the mixer output. It can be seen that the output varies sinusoidally with the input signal phase difference, a positive peak being established when the input signals are in phase. The output trace has a negative slope and is at a null at a 90° phase difference, and thereafter at intervals of (90°+n360°), where n is an integer. The mixer output trace has a positive slope and reaches a null at the mid points between the negative slope nulls, or at (270°+n360°). The action of the feedback loop is such that stable operating points are established at the negative slope nulls (90°+n360°), with the feedback circuit opposing any tendency of the transmitted signal to stray from the null. At these phase differences the system is operating with a negative feedback loop. At the positive slope nulls (270°+n360°), however, a positive feedback loop is established and the system is unstable. Any departure from a positive slope null is reinforced by the feedback loop until the system stabilizes at a negative slope null (90°+n360°). The system utilizes this mixer characteristic by adjusting the transmitted signal frequency until the phase difference between the transmitted and received signals stabilizes at 90°. Given a fixed phase difference of 90°, the distance from the transmitter to the target and back to the in its place is a direct function of the transmission signal wavelength, which in turn is an inverse function of the transmission signal frequency. Thus, the distance to the target can be obtained by sensing the transmission frequency once the phase difference between the transmitted and received signals has stabilized at 90°.

Referring back to FIG. 1, the output of mixer 12 is applied over line 16 to a loop filter 18 which amplifies and provides signal shaping to the mixer output signal. Loop filter 18 furnishes a stable control signal over line 20 to a voltage controlled oscillator (VCO) 22, with the filter controlling the bandwidth and damping factor of the VCO loop. VCO 22 produces an oscillating output signal over line 24, the frequency of which varies in response to the magnitude of the input voltage signal from the loop filter. VCO output line 24 is connected to a frequency divider circuit 26, which divides the VCO output frequency by a predetermined amount. Frequency division by a factor of approximately 10 will produce good results, but there is considerable latitude in the choice of the amount of frequency reduction. As explained in further detail below, the frequency of the signal at the output of frequency divider 26 is low enough for a coarse distance measurement to be made without phase ambiguities. The frequency of the VCO output signal is a multiple of the frequency divider output signal, and is sufficient to produce a fine distance measurement after the coarse measurement has been achieved.

The output of frequency divider 26 is applied over line 28 to transmitter 2, which produces a transmission signal having a frequency which is the same as the frequency divider output, or a known multiple thereof. The frequency divider output is also provided to a frequency counter 30, which detects the divider output frequency at any given time. The output of the frequency divider is delivered to a delay compensation circuit 32, and from there to a display 34 which indicates the target distance corresponding to the frequency detected by frequency counter 30.

The operation of the loop thus described provides a stable frequency output which varies with the distance from the transmitter 2 and receiver 6 to a target. The signal at receiver 6 will lag behind the signal at transmitter 2 by an amount which varies with the round trip distance of the transmitted signal, thus producing a phase delay between the received and transmitted signals. This phase differential is detected by mixer 12. If it is less than 90°, mixer 12 produces a positive voltage output, forcing VCO 22 to a higher frequency output and thus increasing the frequency of the transmission signal from transmitter 2. Since this higher frequency transmission signal still traverses the same distance between transmitter 2 and receiver 6, the phase difference between the transmitted and received signals will increase, causing the phase differential presented to mixer 2 to approach more closely to 90°. Mixer 12 will continue to produce a positive voltage output, but its magnitude will progressively decrease as the frequency output of VCO 22 increases until a stable operating point, with a phase differential of 90° applied to the mixer and a zero volt mixer output, is reached. The VCO frequency at this point may be taken as an indication of the target distance. If the initial phase differential presented to the mixer is within the range 90°–270°, the mixer produces a negative voltage output which progressively reduces the VCO output frequency until a stable operating point is again reached at 90°.

The function of delay compensator 32 is to compensate for the internal time delays of transmitter 2 and receiver 6, which otherwise would be added to the transmission signal transit time and produce an erroneously large phase differential for mixer 12. The transmitter and receiver time delays are determined by their bandwidths, and remain substantially constant over a range of VCO output frequencies. With typical transmitter and receiver bandwidths of about 100 megahertz, the transmitter and receiver will each add time delays of about 3–5 nsec. This compares to a propagation speed for electromagnetic radiation in air of about 3 nsec. per meter. Thus, for a target distance of 1 meter, corresponding to a round trip between transmitter and receiver of about 2 meters, the signal transit time in air will approximately equal the time delays introduced by the transmitter and receiver. For greater target distances the transmitter and receiver delays relative to the signal transit time progressively decrease. Since the transmitter and receiver delays are known and substantially constant, appropriate compensation to remove their effect on the final distance determination can be added at various points in the circuit, with compensation circuit 32 between frequency counter 30 and display 34 illustrating one possible location. Alternatively, the system can initially be calibrated to a known target distance to eliminate the effects of the transmitter and received internal delays.

The greatest source of error in the system described thus far stems from voltage offsets in mixer 12. This error varies with the frequency of the signal on input line 14, and in accordance with the invention is greatly reduced by a two-step measurement technique. Referring again to FIG. 1, a special coarse/fine measurement arrangement is provided that mitigates the effect of the mixer offset voltage and in effect achieves accuracy in the picosecond regime without actually having to measure signals of that short duration. To accomplish this result, the output of frequency divider 26 is connected over line 36 to a switch terminal 38 for coarse measurement, while the VCO output is applied over line 40 to another switch terminal 42 for fine measurement. A third switch terminal 44 is connected to a low frequency signal source 46. A switch lever 48, which is connected to the mixer input line 14, can be switched to contact any of terminals 38, 42 or 44 (although the switch is illustrated as a mechanical device, it could be implemented electronically).

FIG. 3a illustrates the operation of the system for coarse and fine distance measurements. This figure illustrates the signals applied to the two inputs of mixer 12 when the switch is set at the coarse terminal 38. In this illustration it is assumed that the feedback circuit has stabilized at a VCO output frequency corresponding to a 90° phase differential between the two mixer inputs. The effects of the transmitter and receiver time delays are ignored, since they can be eliminated anyway in the final distance measurement. The vertical axis indicates the magnitude of the signal at transmitter 2, which is assumed to be equal to the signal at coarse switch terminal 38. The signal at this point is illustrated as being at a peak. The horizontal axis corresponds to distance along the transmission signal path. The magnitude of the sinusoidal transmission signal decreases from a peak at the transmitter until it reaches zero at point 50. Since the loop stabilizes with a 90° phase shift between the transmitter and receiver signals, point 50 represents the signal at the receiver 6, which is assumed to be equal to the signal on mixer input line 8. Since the transmission frequency is known, the distance from the transmitter to the target and back to the receiver can easily be calculated as one-fourth the transmission signal wavelength, and from this a coarse indication of the target distance is obtained.

Referring now to FIG. 3b, the VCO output signal presented to fine switch terminal 42 is illustrated. This signal has a frequency which is a predetermined multiple of the transmission signal frequency, as determined by frequency divider 26. As mentioned, the major source of error in the loop stems from an inherent voltage offset within mixer 12, and this error varies approximately inversely with the frequency of the signal applied to the mixer. In accordance with the invention, a fine distance measurement is obtained by applying to the mixer a periodic signal having a frequency which is greater than the transmission signal frequency by a predetermined multiple. This VCO signal output is illustrated in FIG. 3b. It is shown as having a frequency approximately 9 times greater than the frequency of the transmission signal illustrated in FIG. 3a, although this multiple could be varied.

Switch lever 48 is moved from coarse terminal 38 to fine terminal 42 when the loop has settled at a coarse frequency level. When the switch lever is first moved to the fine switch terminal, the VCO signal at that terminal will typically not be exactly 90° out of phase with the other mixer input signal over line 8. In the illustration of FIG. 3b, this initial phase differential at point 52 is between 0° and 90°, with a 0° reference taken at the beginning of each cycle. In this situation, a positive voltage signal will be applied to the VCO, causing it to increase its output frequency slightly until a stable loop is restored. Since the accuracy of the mixer, and thereby the accuracy of the entire measurement system, varies positively with the frequency of the transmission signal applied to the mixer, using a multiple of the transmission frequency increases the overall system accuracy accordingly.

It may be asked why a coarse adjustment is used at all, since it is only an intermediate step in the final distance measurement. The answer may be obtained from a study of FIG. 3b. Although the higher signal frequency yields a greater accuracy, it can be seen that the VCO output signal undergoes several cycles between the VCO and receiver. If the system were initiated in the fine measurement mode, there would be an ambiguity as to which of the cycles represented the actual stabilization point. Since stable operating points are established at 90° phase differentials in each of the other cycles, including cycles beyond the receiver, it would be possible for the system to settle at an erroneous frequency corresponding to one of these other 90° phase differentials. The recognition and solution of this problem forms an important part of the present invention. The function of the coarse adjustment is to set the VCO output frequency at a level such that the frequency divided transmission signal causes the system to lock onto the correct VCO output cycle when the system is switched to fine adjustment. During fine adjustment the higher frequency applied to the mixer is then used to reduce the initial coarse measurement error.

Although used for coarse measurement, the transmission signal is also periodic and exhibits repeated 90° phase points. To prevent the system from locking onto the wrong cycle of the transmission signal during coarse measurement, the VCO is initially set at a relatively low frequency such that the first stable operating point reached during coarse adjustment corresponds to the fundamental quarter wavelength differential between the transmitted and received signals illustrated in FIG. 3a. If the initial VCO frequency is too high, the system can initially lock into a higher order phase differential equal to $90° + n360°$, where n is an integer greater than 1 or equal to 1. To prevent this, the switch lever 48 in FIG. 1 is set on low frequency terminal 44 before entering the coarse adjustment mode. Low frequency signal generator 46, which in its least complicated implementation is a simple ground connection, provides a low frequency starting point for the VCO such that its first stable operating point encountered during coarse adjustment is a true quarter wavelength phase differential. Although a simple ground connection is preferred, low frequency signal generator 46 can generate any DC signal or an AC signal having a sufficiently low frequency. As illustrated in FIG. 4, the low frequency signal can produce a phase differential of up to 270° at the mixer inputs and still assure a true quarter wavelength differential during coarse adjustment. If the initial phase differential is in the range 90°–270°, a negative mixer output is produced that causes the VCO output frequency to drop until the stable quarter wavelength operating point is reached. To assure a sufficiently low initial frequency over the entire distance measurement range, the signal produced by low frequency generator 46 should have a wavelength which is at least 4/3 times the round trip distance between the transmitter 2 and receiver 6, corresponding to a maximum phase differential of 270° applied to the mixer.

The above system avoids the need for very complex signal handling circuitry, and yet achieves highly accurate measurements, with an error factor of about 0.1%–1%, for target distances in the range of about 1–10 meters. It involves a low bandwidth, high resolution feedback loop and VCO frequencies in the order of roughly 3–30 megahertz for optical transmissions through air. Relatively uncomplicated circuitry can be designed to handle this frequency range. The signal transit time between transmitter and receiver is typically in the order of roughly 10–100 nsec., yet accuracies normally associated with the picosecond regime are achieved. While particular embodiments of the invention have been shown and described, numerous variations and alternate embodiments will occur to those skilled in the art. Accordingly, it is intended that the invention be limited only in terms of the appended claims.

I claim:

1. A system for measuring medium range distances (of about 1–10 meters) to a target, comprising:
   means for transmitting a periodic transmission signal having an initially predetermined frequency toward a target,
   means for receiving at least a portion of the signal reflected from the target,
   means for comparing the transmitted and received signals to determine the phase difference therebetween,
   means for adjusting the frequency of the transmitted signal until a predetermined phase difference between the signals applied to the signal comparing means is reached, the adjusted initially predetermined transmission signal frequency corresponding to a coarse distance measurement,
   means for applying a signal having a frequency greater than the adjusted transmitted signal frequency by a predetermined frequency multiple to the signal comparing means for comparison with the received adjusted signal after the coarse distance measurement has been achieved, thereby enabling the frequency adjusting means to adjust further the frequency of the adjusted transmitted signal until a predetermined phase difference between the frequency multiplied signal and the received signal is reached, the further adjusted transmission signal frequency corresponding to a fine distance measurement, and
   output means for indicating the target distance corresponding to the further adjusted transmission signal frequency.

2. The distance measuring system of claim 1, further comprises means for setting the transmission signal at an initially predetermined frequency which is low enough so that the predetermined phase difference reached during coarse adjustment is a fundamental phase difference.

3. The distance measuring system of claim 1, the signal comparing means comprising a mixer adapted to produce a null output when the phase difference between its input signals is $(90° + n360°)$, where n is a integer.

4. The distance measuring system of claim 3, further comprising means for setting the initially predetermined transmission signal at a wavelength which is at least about 4/3 times the round trip distance between the transmitting and receiving means, and thereby avoiding ambiguities in the transmitted signal wavelength presented to the comparing means.

5. The distance measuring system of claim 4, wherein the initial signal applied to the signal comparing means is furnished by a ground connection.

6. The distance measuring system of claim 1, the transmitting and receiving means adding respective time delays to the transmitted and received signals, the system further comprising means to compensate for said time delays so that the output means indicates a target distance based substantially only upon the transmitted signal transit time between the transmitting and receiving means.

7. The distance measuring system of claim 1, wherein the transmission signal comprises electromagnetic radiation.

8. The distance measuring system of claim 7, wherein the transmission signal comprises optical radiation.

9. A system for measuring medium range distances (of about 1–10 meters) to a target, comprising:
   a single voltage controlled oscillator (VCO),
   a frequency divider connected to divide the VCO output by a predetermined amount,
   means for transmitting toward a target a periodic transmission signal having a frequency corresponding to the output frequency of the frequency divider,
   means for receiving at least a portion of the signal reflected from the target,
   a mixer having a coarse connection to compare the transmitted and reflected signals to determine the phase difference therebetween, and a fine connection to compare the VCO output and reflected signals to determine the phase difference therebetween, the mixer producing a null output when the phase difference between its inputs is (90°+n360°), where n is an integer, means connected to present the mixer output as a voltage control input to the VCO, the VCO adjusting its output to a frequency at which the mixer output is at a null, means for switching the mixer from its coarse connection to its fine connection when an initial mixer null been reached with the coarse connection, thereby enabling a fine adjustment of the VCO output frequency, and output means for indicating the target distance corresponding to the VCO output frequency.

10. The distance measuring system of claim 9, further comprising means for initially applying to the mixer a relatively low frequency signal for comparison with the reflected signal, before the coarse connection, and thereby avoiding ambiguities in the determination of the transmitted signal wavelength presented to the mixer during the coarse connection.

11. The distance measuring system of claim 10, wherein the relatively low frequency signal is furnished by a ground connection.

12. The distance measuring system of claim 9, the transmitting and receiving means adding respective time delays to the transmitted and received signals, the output means including means to compensate for the effect of said delays on the distance indication.

13. The distance measuring system of claim 9, the output means comprising means connected to detect the output frequency of the frequency divider, and a display means adapted to display the output of the frequency detection means as a distance measurement.

14. The distance measuring system of claim 9, wherein the transmission signal comprises electromagnetic radiation.

15. The distance measuring system of claim 14, wherein the transmission signal comprises optical radiation.

16. A system for measuring medium range distance (of about 1-10 meters) to a target, comprising:

means for transmitting a periodic transmission signal having an initially predetermined frequency toward a target, means for receiving at least a portion of the signal reflected from the target, a signal comparison means connected to compare the transmitted and received signals and to produce an output indicative of the phase difference therebetween, a feedback circuit connecting the output of the signal comparison means with the transmitting means, said feedback circuit adjusting the frequency of the transmission signal toward a stable comparison means output, the transmitted initially predetermined signal frequency being adjusted to a level corresponding to a coarse distance measurement when the transmitted and received signals are compared, means for obtaining a frequency multiplied signal having a frequency which is a fixed, greater than unity multiple of the adjusted transmission signal frequency, means for applying said frequency multiplied adjusted signal to the signal comparison means for comparison with the received signal after the coarse transmission signal frequency has been established, said feedback circuit further adjusting the adjusted transmitted signal frequency to a level corresponding to a fine distance measurement in response to the signal comparison means output, and output means connected to indicate the target distance corresponding to the finely adjusted transmission signal frequency.

17. The distance measuring system of claim 16, the signal comparison means producing stable outputs corresponding to a series of periodically recurring phase differentials between its inputs, further comprising means for initially applying to the signal comparison means, for comparison with the received signal, a signal having a wavelength within the stability range of the first such periodic phase differential which corresponds to a maximum coarse distance measurement, and thereby avoiding period ambiguities in the relative phases of the signals presented to the comparison.

18. The distance measuring system of claim 16, wherein the initial signal applied to the signal comparing means in a DC signal.

19. A method for measuring medium range distances (of about 1-10 meters) to a target, comprising the steps of:

transmitting a periodic transmission signal having a predetermined initial frequency toward a target, receiving at least a portion of the signal reflected from the target, determining the phase difference between the transmitted and reflected signals, adjusting the frequency of the transmitted signal until a predetermined phase difference corresponding to a coarse distance measurement is reached between the transmitted and received signals, generating a frequency multiplied signal having a frequency greater than the adjusted transmission signal frequency by a predetermined multiple, after said adjusted transmission signal frequency has been determined, adjusting the frequency of the transmitted signal after the coarse adjustment until a predetermined phase difference corresponding to a fine distance measurement is reached between the frequency multiplied and received signals, and indicating the target distance corresponding to the finely adjusted transmission signal.

20. The method of claim 19, further comprising the step of initially setting the transmission signal prior to coarse adjustment at a frequency such that its wavelength is at least as great as the difference between the maximum transmission signal round trip distance and said predetermined phase difference applied to said maximum distance, whereby the transmitted signal frequency is adjusted from the initial signal frequency during coarse adjustment without encountering phase ambiguities.

21. The method of claim 20, wherein the initial transmission signal is furnished by a ground connection.

22. The method of claim 19, wherein the periodic signal is transmitted and received by means which add time delays to the signal, further comprising the step of compensating for said time delays so that the indicated target distance corresponds substantially only to the signal transit time between transmission and reception.

23. The method of claim 19, wherein the transmitted signal comprises electromagnetic radiation.

24. The method of claim 23, wherein the transmitted signal comprises optical radiation.

* * * * *